Jan. 14, 1941.　　G. L. REICHHELM ET AL　　2,228,733
COMPRESSION CONTROL APPARATUS
Filed April 26, 1938
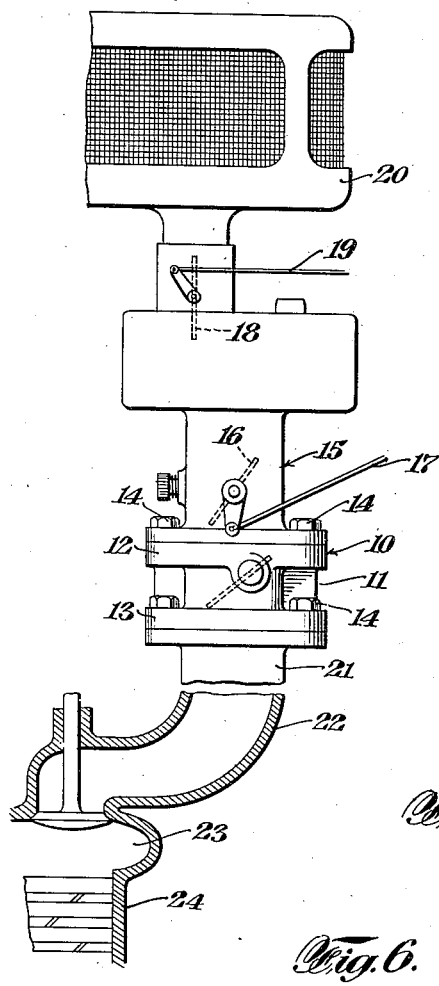
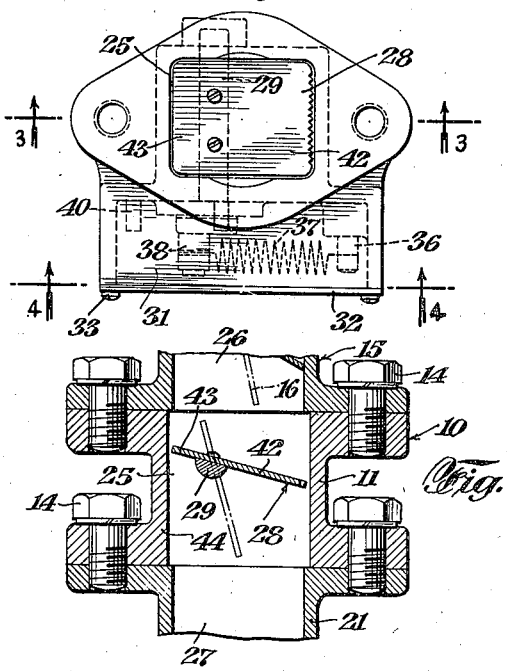
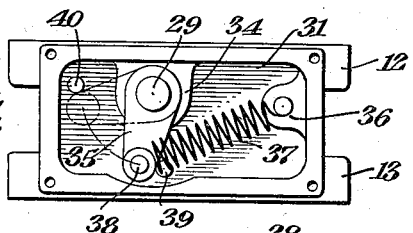
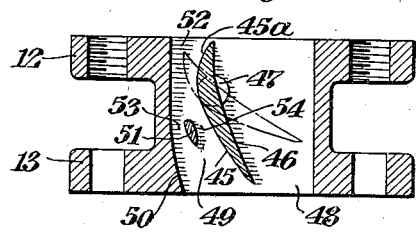
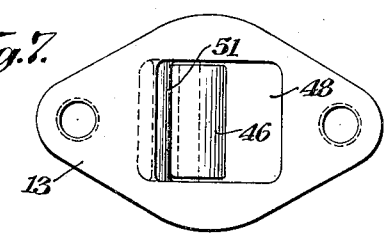
INVENTORS
GEORGE L. REICHHELM, ERIC HOLM,
FRANK A. KANE, JR., & OTIS C. FUNDERBURK
BY
ATTORNEY Patented Jan. 14, 1941

2,228,733

UNITED STATES PATENT OFFICE 2,228,733

COMPRESSION CONTROL APPARATUS

George L. Reichhelm, New Haven, and Eric Holm and Frank A. Kane, Jr., Derby, Conn., and Otis C. Funderburk, Weston, Mass., assignors, by mesne assignments, to Kane Carburetor Corporation of Delaware, Wilmington, Del., a corporation of Delaware Application April 26, 1938, Serial No. 204,364

1 Claim. (Cl. 48—180)

This invention relates to a compression control apparatus for internal combustion engines, and more particularly to a device for automatically operating an auxiliary intake throttle in accordance with the rate of flow of the fuel and air stream from a conventional carburetor.

It is primarily within the contemplation of this invention to maintain substantially constant predetermined intake manifold depressions at all speeds when the carburetor throttle is not holding the manifold vacuum to a greater value than the predetermined depression,—and to consequently reduce or entirely eliminate detonation; and in effecting this objective it is a further purpose of our invention to control the said depression throughout the entire range of engine operation without in any way restricting the flow of the fuel and air mixture at full-speed or wide-open throttle conditions. And in this aspect of our invention it is another one of our objects to effect such control over conditions in the intake manifold as to produce closely calibrated and predetermined depressions therein, invariably maintained during all operating conditions of the motor.

It is known that in internal combustion engines designed according to common practice the intake manifold depressions vary over a wide range, generally from 18 to 22 inches Hg at idling or slow running speeds to a value as low as one-half inch $H_2O$,—such extremely low depressions generally following the sudden opening of the carburetor throttle and being due to the fact that the flow resistance is comparatively low for the lower flow rates of the fuel-air mixture. And under these conditions, when the accelerator is suddenly depressed, it is an established fact that there is a sudden surge of air,—air being lighter than gasoline,—thereby not only producing a lean and hence improper mixture, but also, because of the unrestricted flow of the charge, resulting in cylinder compressions higher than normal. Under these conditions flame propagation is most rapid, and detonation or "knocking" is the obvious result. In conceiving this invention it has hence been one of our main objectives to improve upon said conditions by maintaining manifold depressions of substantially constant value with predetermined throttle openings throughout the speed range, as aforesaid, thereby eliminating one of the prime causes of detonation.

In accomplishing the aforesaid objectives, we employ in our invention an automatic auxiliary throttle actuated in accordance with the flow of the final air and fuel mixture in the intake of the motor, the device being of such a nature as not to offer any increased flow resistance at high flow rates, such as occurs with governor devices. It is indeed one of our objects to produce a result quite the reverse of that effectuated by the usual governor appliance which offers no obstruction to the flow of the air-fuel mixture at low speeds, but does throttle the engine at high speeds to cause a corresponding lack of proper cylinder filling,—whereas with our invention the throttling effect occurs at low speeds, there being a gradual reduction in flow restriction as the speed increases with practically no restriction to the flow of the charge at full speed or wide open throttle. Cognizance is taken of certain other attempts to accomplish this purpose, but most of these have resulted in the employment of relatively intricate and ineffective devices; and it is hence further within the contemplation of our invention to attain these objectives by means of a simple and efficient apparatus.

It is another object of this invention to reduce fuel consumption in internal combustion engines not only by maintaining a proper fuel and air ratio, but also by effecting more efficient atomization. It is known that no matter how finely gasoline is atomized as it leaves the main carburetor jet, some of it is condensed on the valve and valve shaft of the carburetor and is forced off in relatively large drops. We contemplate by our invention to extend the accelerating charge over a longer "dwell" or period, particularly in down-draft structures, our device holding back all excess quantities or globules of gasoline ejected from the acceleration pump of the carburetor and preventing such globules from immediately entering the mixture stream, thereby enabling any such collected residual gasoline to be forced across the sharp edges of the throttle valve forming part of our device upon a continued flow of the fuel and air mixture. In order to further enhance this effect, and produce a more homogeneous mixture, we employ, in a preferred form of our throttle valve, serrated means for producing a finely divided fuel, in a manner to be hereinafter set forth.

With the elimination of the sudden injection of quantities of unvaporized gasoline, it is obvious that the process of acceleration is further improved in that crank case dilution of the lubricating oil is reduced, the danger to the cylinder walls from unduly wet mixtures is removed, and smoke in the exhaust is eliminated,—all of which constitute further objects of our invention.

Still another object of this invention is to eliminate back firing or pre-ignition of the intake mixture by providing a closure for the passage between the carburetor and the engine, and in this manner arresting the progress of any flame that may be present in the intake manifold.

Another object is to eliminate flutter or the synchronized opening and closing of the throttle due to intermittent suction pulsations of the engine, this being accomplished by dampening the impulses which tend to cause such conditions.

And a further object is to enable an internal combustion engine to be designed with a higher compression ratio than is normally possible, by lessening or entirely eliminating the detonation tendency at low speeds.

Referring to the drawing,

Figure 1 is an elevation partly in section of a portion of an internal combustion engine showing the relative position of our invention with respect to other conventional parts of the structure.

Figure 2 is a plan view of the compression control apparatus constituting our invention.

Figure 3 is a section of Figure 2 taken along line 3—3, showing fragmentary portions of the carburetor structure and intake manifold, the throttle valve being shown in two operative positions.

Figure 4 is an end view taken substantially along line 4—4, the cover plate being removed, certain of the parts being shown in two extreme positions.

Figure 5 is a perspective of the throttle plate and mounting therefor.

Figure 6 is a vertical section of a modified form of our invention, showing a streamlined throttle valve and a variable Venturi arrangement, the valve being shown in two positions.

Figure 7 is a plan view of Figure 6, and

Figure 8 is a modified form of spring control for the throttle valve of our invention.

In the drawing, and particularly in Figure 1 thereof, the compression control device 10 constituting our invention includes the casing 11 which is essentially a gland having inlet and outlet flanges 12 and 13 respectively, these being attached by suitable bolts and nuts 14 to the engine structure. The intake portion of the device is secured to the carburetor structure 15 which contains the throttle valve 16 manually or otherwise controlled by the link 17. The carburetor is also provided with the choke valve 18 suitably actuated by link 19, the air for the fuel entering through the air strainer 20. The outlet portion of the device 10 is connected, in the form illustrated, to the intake manifold trunk 21 which is suitably connected through the manifold branch 22 to the combustion chamber 23 of the cylinder 24.

The casing 11 of our compression control device contains therein a conduit 25 which communicates between the carburetor outlet 26 and the intake manifold 27. The said conduit 25 is, in the preferred form shown, entirely unobstructed, except for the plate valve 28, which is pivotally mounted off-center with respect to the length thereof. As illustrated in the drawing, said mounting consists of a shaft 29 extending transversely across the conduit 25 and rotatably mounted within the walls of casing 11, that portion of the said shaft extending within conduit 25 having attached thereto, by means of the screws 30, the valve 28. It will be noted that shaft 29 is in engagement only with the engine side of valve 28, which in the down draft construction illustrated is the undersurface of said valve, the upper surface being substantially flat, except for the small screws 30.

The casing contains exteriorly disposed with respect to the conduit a chamber 31 normally kept closed under operating conditions by the cover plate 32 attached to the casing by the screws 33. Said casing contains a boss 34 through which extends one terminal of the shaft 29, said terminal having rigidly affixed thereto the lever 35. Anchored at lug 36 of the casing is the spring 37 which is suitably attached to the lever 35 at portion 38 thereof. Extending into said chamber 31 are the stops 39 and 40 to limit the movement of the lever 35 and consequently the valve 28.

It will be noted that the spring 37 constantly urges the lever 35 in a counterclockwise direction, whereby it is normally held in abutment against the stop 39, as shown in Figure 4, to keep the valve 28 in its closed position substantially obstructing the conduit 25 as shown in Figure 3. It will also be observed that, in the form illustrated, the lowermost edge 41 of the valve 28 is serrated, this being a preferred although not an indispensable arrangement.

As will be noted from an inspection of Figures 2, 3 and 4, the lever 35 is substantially at right angles to the plane of the valve 28. When the valve is in its closed position, the position of the lever 35 is as shown in full lines in Figure 4, and the spring 37 obviously exerts a force thereagainst in an angular direction with respect to the length of said lever 35. When, however, the lever 35 is brought to its open position against stop 40, as shown in Figure 4, the spring 37 extends substantially longitudinally of the said lever 35, and will exert a pull thereagainst in a direction substantially parallel to the length of said lever. Hence the moment arm of said lever 35 is decreased as the valve is brought to its open position, until, when it is in its ultimately extreme open position with the lever against stop 40, said moment arm is almost zero, so that at said point the effective pull of the spring 37 is less than it is when the lever 35 is in the position against stop 39. With this preferred arrangement, there is thus a constantly decreasing yieldable resistance, as the valve 28 is being opened, against any opening effort applied thereto. The advantage of this construction will appear from the description hereinafter given.

In the operation of this device the spring 37, as aforesaid, normally keeps the valve 28 in its closed position, thereby substantially obstructing the intake passageway to the engine. Hence at idling speeds of the engine the valve 28 may be in its ultimate or near ultimate closed position, the small spaces between valve 28 and the walls of the conduit 25 being sufficient to permit the passage of small portion of the air-fuel mixture therepast. Upon increased demands of the engine and upon an opening of the carburetor throttle 16, it is obvious that greater quantities of the air-fuel mixture will enter the flow conduit 25, and inasmuch as the action of the engine causes a depression in the manifold 27 on the engine side of valve 28, said valve will be forced to open, against the action of spring 37, by the air of the fuel-mixture coming into engagement therewith during its course of flow through conduit 25.

It has previously been seen that the shaft 29 is mounted off-center with respect to the valve 28, thereby dividing the valve into two portions, the long portion 42 and the short portion 43. Although the incoming air strikes both of these portions, it is apparent that it will exert a greater total pressure upon the long portion 42 than upon the short portion 43, thereby causing an opening of the valve, as is indicated by the dot-dash lines in Figure 3. The said spring 37 is so selected and so calibrated as to effect a predetermined resistance to the motivating current of air, in accordance with the particular design of the engine, as will be more fully hereinafter set forth. It is thus seen that the device comprising our invention operates entirely automatically, without any manual or mechanical controls, being actuated solely by the flow of the final air and fuel mixture from the carburetor.

It is important to note that the shaft 29 is mounted on the engine side of valve 28, or on the side thereof disposed towards the intake manifold. This produces an effect approaching that of an airplane wing construction having a relatively thick portion at one section thereof gradually tapering down to a thin edge. Although the form shown particularly in Figure 3 does not precisely have such a construction, there being no gradual tapering down of the valve towards the terminal edge thereof, nevertheless the effect is substantially similar to that produced by a streamlined airplane wing, in that the shaft 29 tends to create an increased depression on the underside of valve 28. In other words, the air coming in through the conduit 25 at the short side of the valve (the left side in Figure 3) will encounter a restricted portion formed by shaft 29 and the left wall 44 of the casing, thereby producing a Venturi effect and causing an increased depression on the underside of valve 28. It is thus obvious that the air passing through conduit 25 at the long portion of valve 28 (right side of conduit 25, Figure 3) will encounter less resistance in its effort to turn the valve 28 in a clockwise direction inasmuch as there is a greater pressure differential on opposite sides of the valve. Hence with a given carburetor throttle opening, there will be a greater rate of flow of the charge through the conduit 25 when the shaft 29 protrudes outwardly from the engine side of valve 28, than otherwise.

It is apparent that when the carburetor throttle valve 16 is opened, the depression in the manifold 21 becomes lowered by reason of the fact that air flows through the conduit 25 towards the intake valves of the engine. As the carburetor throttle 16 is opened still wider, more air flows through the device and lowers the manifold depression accordingly, by providing a greater rate of flow through the carburetor to the engine cylinders. The greater the flow, the more will the valve 28 be opened until it reaches its extreme position when the lever 35 is in abutment with stop 40, thereby offering no material restriction at this point to the flow of the final fuel and air mixture. In this manner the cylinders are charged with a larger volume of fuel at open throttle conditions, resulting in higher mean effective pressures, which in turn produce higher torques and increased power output.

As the valve 28 is being opened, the projected area of the long portion 42 thereof will be correspondingly decreased, so that the fuel and air charge from the carburetor will encounter a smaller effective surface of valve 28 as it is being opened, until, when it reaches the position shown by dot-dash lines in Figure 3, there will be a relatively small projected area of the valve 28 in the path of the charge flowing through conduit 25. As the said projected area of valve 28 decreases, it is obvious that the opening effort of the charge impinging upon portion 42 of the valve will be proportionately decreased. But it will be remembered from the explanation hereinabove given that the effort of the spring 37 also decreases as the valve is being opened, so that the total effective net opening effort of the charge from the carburetor is substantially constant throughout the entire operating range of valve 28.

It is obvious that the device above described can be set at any predetermined value of intake manifold depression by employing a properly designed spring 37, so that the intake manifold depression of the engine can be maintained substantially constant at the value thereof set by the manufacturer of the engine for maximum horse power and speed. With our invention the manifold depressions or partial vacuums cannot drop below the predetermined level, as determined by the tension within spring 37.

In our invention as hereinabove described, there cannot be such a sudden surge of air into the engine cylinders as generally occurs in conventional designs when the throttle is suddenly opened, inasmuch as valve 28 is partially closed at such time and restricts the flow of the charge. It is thus obvious that when such sudden surges of air are prevented at the time of acceleration, not only is a proper fuel and air ratio maintained, but the unusually high compressions resulting from such air surges are prevented, thereby removing one of the main factors causing detonation. If upon suddenly opening the carburetor throttle wide, the acceleration pump of the carburetor, if it is provided with such a means, should eject excess quantities of unvaporized globules of gasoline, these will be received and held back by the valve 28; and only as the said valve 28 is gradually opened against the action of spring 37 will such accumulations of gasoline be forced into the intake manifold,—this process being obviously a gradual one due to the resistance of said spring 37. This provides a greater acceleration period, and enables any such unvaporized particles of gasoline to be forced across the sharp edges of valve 28 to be dispersed therefrom in a finely divided state. It should be noted that in its preferred form, the peripheral edge of valve 28 is sufficiently removed from the walls of the conduit (when in its closed position) to provide a very narrow slit between the said walls and substantially the entire periphery of the valve, thereby presenting a dispersing edge of considerable linear proportions for atomizing the fuel stream flowing therepast. And for enhancing this effect, we prefer to serrate the edge 41, thereby enabling this device to function as an efficient vaporizer, particularly inasmuch as the said serrated edge 41 is at all times positioned in the zone of highest velocity in conduit 25.

It is also apparent that inasmuch as large quantities of unvaporized fuel are prevented from entering the intake manifold at the instant of acceleration, there will be less crankcase dilution of the lubricating oil, and the cylinder walls will be free from unduly wet mixtures. Furthermore, it is obvious that this will eliminate deposition of carbon and prevent smoky products of combustion, and will result in greater power and better fuel economy, particularly inasmuch as the cylinders are kept from overcharging with an incorrect ratio of air to gasoline.

It should also be observed that inasmuch as the conduit 25 contains no obstructions therein other than the valve 28, the device can be properly calibrated, and can function efficiently at all rates of flow therethrough.

In the modified form of this invention shown in Figures 6 and 7, the underside 45 of the valve 46 is built up substantially in the shape of an airplane wing, the thickest portion thereof being in the region of shaft 47, the valve tapering down therefrom to its edges. In this form, the outlet portion of the conduit 48 contains a somewhat restricted portion 49 due to the inwardly tapering wall 50; and positioned between the wall 50 and the axis 47, on the engine side of the valve, is the wall 51, preferably of streamlined construction and extending transversely across the conduit. Due to the restriction in throat 52, it is obvious that a reduced pressure will be created at the underside of the valve 46, thereby producing a greater pressure differential on opposite sides thereof. It will also be observed that the wall 51 further provides two smaller throats or restricted regions 53 and 54, separating that portion of the charge which enters through passageway 52 into two sections, and inasmuch as two restricted regions are now formed, the depressions below the valve 46 will be greater, resulting in more effective operation, particularly when the valve 46 is in its open position as shown in Figure 6.

It will be noted that when the valve 46 is in its open position, the uppermost portion 45a of the undersurface 45 is disposed towards the carburetor, in the preferred form of this device, whereby a portion of the fuel stream entering the conduit 48 will impinge thereagainst to further aid in the opening effort applied to the valve at this point. Without such an arrangement, the fuel stream would engage the upper surface of the short side of the valve to partly counteract the opening effort.

In the construction shown in Figure 8 the lever 55 is operatively connected to the spring 56 in the manner hereinabove described. However, said lever contains a post 57 thereon to which is anchored an auxiliary spring 58, there being three annular recesses 59, 60 and 61 on the post for anchoring said spring. The other terminal of the spring 58 is anchored on a sleeve 62 preferably provided with annular grooves or threads 63. Said sleeve is held in place against lug 64 by the screw 65 extending therethrough and being in threaded engagement with the body of the said lug, the head of the screw being set within the hollow cup-shaped portion 66 at the upper portion of the sleeve.

By loosening the screw 65, the sleeve 62 can be rotatably manipulated, thereby moving the terminal 67 of spring 58 up or down,—said terminal being engageable with the thread 63 as aforesaid. After the proper position of spring 58 is obtained, the screw 65 is again tightened in place. It is thus apparent that the tension in spring 58 can be varied by varying the angularity and extended length of said spring. This can also be effectuated by varying the position of terminal 68 of spring 58 within any selected one of the annular grooves 59, 60 and 61.

It is obvious that spring 58 serves to resist the effect of spring 56, so that a fine adjustment can be effectuated by manipulating the sleeve 62 as aforesaid, to vary the yieldable resistance that can be applied to a valve such as 28 against an opening effort. The action of spring 58 also eliminates any chattering of the valve, due to its yieldable action thereupon.

It is of course understood that the various embodiments above described and shown in the drawing are illustrative of our invention and not employed by way of limitation, inasmuch as numerous changes and modifications may be made within the scope of the appended claim without departing from the spirit of this invention.

What we claim is:

A compression control apparatus containing a throttling device for controlling the flow of the final air and fuel mixture into an internal combustion engine, comprising a conduit adapted to permit the passage therethrough of said mixture, a throttle valve pivotally mounted within the conduit and normally substantially obstructing the path through said conduit, said path being unobstructed except for said valve, and yieldable means exterior of the conduit exerting a continuous closing effort on said valve, the axis of the pivotal mounting for the valve being off-center with respect to the length thereof whereby the valve is divided into a long portion and a short portion, said valve being operatively responsive to a pressure differential on opposite sides thereof and being so positioned in the conduit as to be adapted to be opened in opposition to said yieldable means by the said mixture acting against the said long portion thereof during the flow of the mixture through said conduit, the long portion of the throttle valve having its terminal edge serrated whereby the stream of the said fuel and air mixture passing between the valve and the adjacent wall of said conduit will be operatively intercepted by said serrated portion.

GEORGE L. REICHHELM.
ERIC HOLM.
FRANK A. KANE, Jr.
OTIS C. FUNDERBURK.